US 6,717,111 B2

(12) United States Patent
Sands et al.

(10) Patent No.: US 6,717,111 B2
(45) Date of Patent: Apr. 6, 2004

(54) GRILLING COMPONENT

(75) Inventors: Jeffrey L. Sands, Freeport, IL (US); James D. Conlin, South Beloit, IL (US); Thomas J. Franken, Roscoe, IL (US); Andrew Paul Franklin, Beloit, WI (US); Randy L. Ginner, Beloit, WI (US); Ronald J. Glavan, Rockton, IL (US); Scott A. Glawe, Roscoe, IL (US); David A. Hill, Beloit, WI (US); Michael J. Newberry, Poplar Grove, IL (US); Jack Pellicane, Wyomissing, PA (US); Manuel Calzada, Rolling Meadows, IL (US); Henry Thomas Ewald, Roselle, IL (US)

(73) Assignee: Carrier Commercial Refrigeration, Inc., Syracuse, NY (US)

( * ) Notice: Subject to any disclaimer, the term of this patent is extended or adjusted under 35 U.S.C. 154(b) by 0 days.

(21) Appl. No.: 10/124,754

(22) Filed: Apr. 17, 2002

(65) Prior Publication Data

US 2003/0197000 A1 Oct. 23, 2003

(51) Int. Cl.[7] .............................. A47J 37/04; F27B 9/06; F27B 9/38
(52) U.S. Cl. .................. 219/388; 99/386; 99/443 C
(58) Field of Search ................ 219/388; 99/349, 99/352, 386, 393, 443 C, 446

(56) References Cited

U.S. PATENT DOCUMENTS

| 1,828,542 | A | * | 10/1931 | Padelford | |
| 3,291,036 | A | * | 12/1966 | Perl | 219/388 |
| 3,611,913 | A | * | 10/1971 | McGinley | 99/349 |
| 3,646,880 | A | * | 3/1972 | Norris | 99/349 |
| 3,739,712 | A | * | 6/1973 | Duning | 99/349 |
| 4,072,092 | A | | 2/1978 | Kohli et al. | |
| 4,373,431 | A | * | 2/1983 | Wallick et al. | 99/386 |
| 5,044,264 | A | * | 9/1991 | Forney | 99/349 |
| 5,458,051 | A | * | 10/1995 | Alden et al. | 99/349 |
| 5,588,354 | A | * | 12/1996 | Stuck et al. | 99/386 |
| 6,112,647 | A | | 9/2000 | Brunner et al. | |
| 6,201,218 | B1 | * | 3/2001 | Chandler et al. | 219/388 |

FOREIGN PATENT DOCUMENTS

| EP | 0655 215 | 5/1995 |
| SE | 513 106 | 7/2000 |
| WO | WO 00/01285 | 1/2000 |

OTHER PUBLICATIONS

European Search Report Dated Jul. 22, 2003.

* cited by examiner

Primary Examiner—Joseph Pelham
(74) Attorney, Agent, or Firm—Carlson, Gaskey & Olds

(57) ABSTRACT

A grilling component includes a pair of grilling structures supported at an oblique angle from the vertical. Each grilling structure includes a heater and a moveable conveyor belt positioned around the heater. As the food travels on the conveyor belts between the heaters, the food is cooked. Preferably, the conveyor belt is made of a non-stick coated Invar™. A lateral sensor positioned proximate to an edge of each of the conveyor belts detects and compensates for lateral movement of the conveyor belts. After the food exits the grilling structures, the food slides onto a heated holding area for serving.

21 Claims, 3 Drawing Sheets

GRILLING COMPONENT

BACKGROUND OF THE INVENTION

The present invention relates generally to grilling component which grills frozen food.

Grills or griddles are used to cook various foods, such as hamburgers. In one prior grill, the sides of the food are grilled separately. The food is placed on a flat grill portion, grilling the side of the food that contacts the flat grill portion. After that side of the food is cooked, the food is manually flipped to allow cooking the opposite side. After the food is cooked, the food is manually removed from the grill for serving.

In another prior grill, both sides of the food are grilled simultaneously. After programming the type of food into a control unit, the food is placed on a lower grill portion. A platen having an upper grill portion is then lowered over the food, positioning the food between the upper and lower grill portions and grilling the food simultaneously on both sides. After lowering the platen, the distance between the upper and lower grill portions is automatically adjusted according to the type of food which is programmed into the control unit. After a predetermined amount of time has passed, the platen raises, and the food is manually removed from the grill.

Another prior grill employs a conveyor belt positioned over a heater. The food is manually placed on the conveyor belt by an operator and grilled while the conveyor belt passes over the heater.

SUMMARY OF THE INVENTION

The grilling component includes a pair of grilling structures supported at an oblique angle from the vertical. In one example, the grilling structures are 5° from the vertical. Each grilling structure includes a heater, a drive pulley, a non-drive pulley and a moveable conveyor belt positioned around the grilling structure. A motor drives the drive pulley to cause the conveyor belt to move over the heater. A drive control provides a signal to drive the motors so the conveyor belts move at the same speed.

As the food travels on the conveyor belts between the heaters, the food is cooked. Preferably, the conveyor belt is made of Invar™ and has a non-stick coating of Teflon™. A lateral sensor positioned proximate to an edge of each of the conveyor belts detects and compensates for lateral movement of the conveyor belts. After the food exits the grilling structures, the food slides onto a heated holding area for serving.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
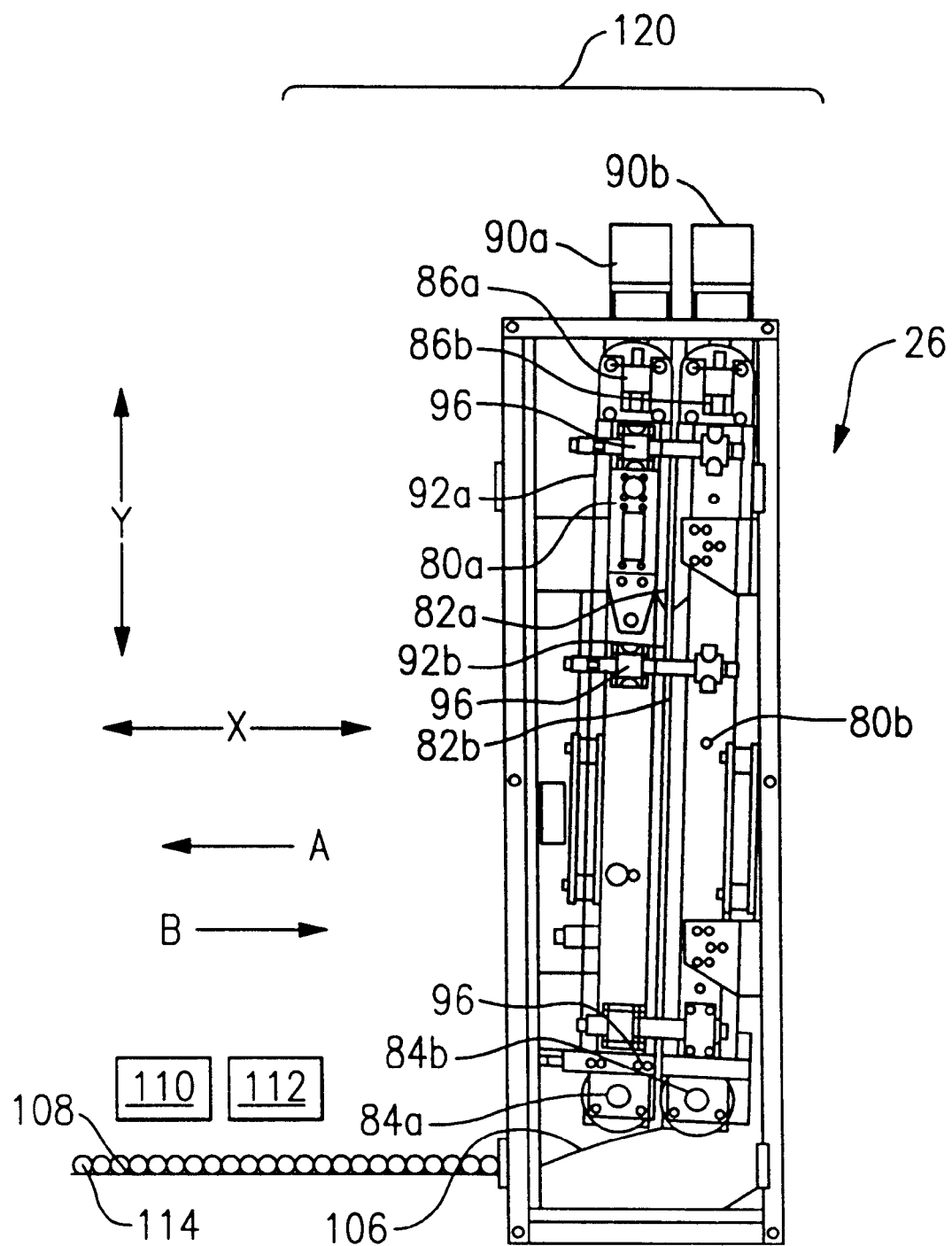
FIG. 1 schematically illustrates a front view of the grilling component of the present invention.
Figure 2:
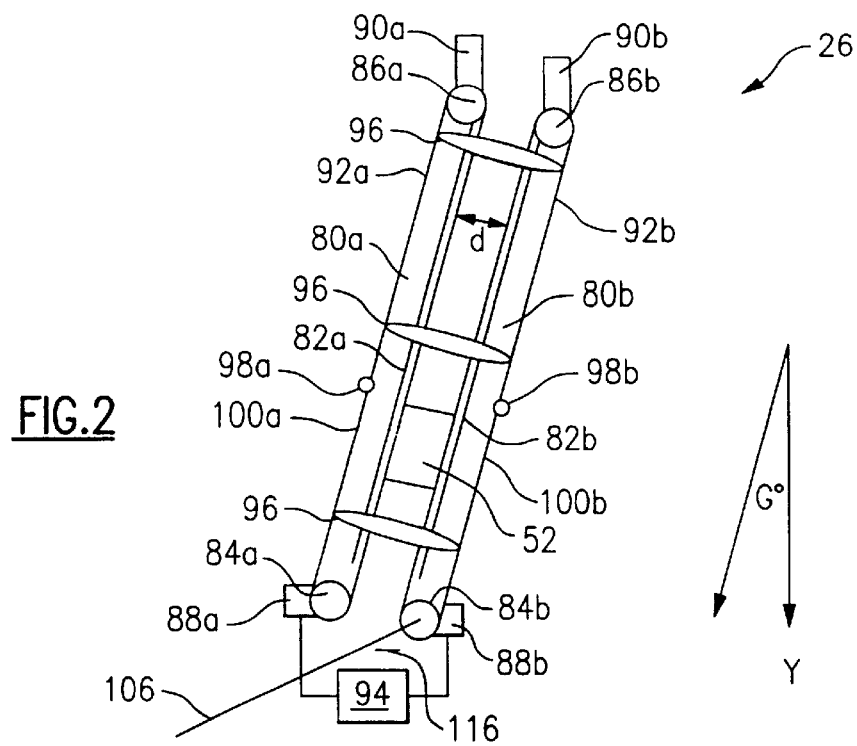
FIG. 2 schematically illustrates a front view of the grilling component illustrating the grilling structures.

As schematically shown in FIGS. 1 and 2, an example grilling component 26 includes a pair of grilling structures 80a and 80b separated by a gap d. Each grilling structure 80a and 80b includes a heater 82a and 82b, a drive pulley 84a and 84b, and a non-drive pulley 86a and 86b. In one example, the heaters 82a and 82b are electric resistance heaters. A conveyor belt 92a and 92b is positioned around the grilling structures 80a and 80b. The heater 82a and 82b in one example grill is at a temperature of 400° F. The drive pulleys 84a and 84b are powered by respective drive motors 88a and 88b to move the conveyor belts 92a and 92b, creating a surface that travels over the heaters 82a and 82b. The non-drive pulleys 86a and 86b are each controlled by a respective adjustment motor 90a and 90b. A drive controller 94 provides a control signal to the drive motors 88a and 88b to synchronize the speed of the conveyor belts 92a and 92b. As shown in FIG. 2, the heaters 82a and 82b are flat.

The food items 52 are grilled by passing the food items 52 in the gap d while food traveling between the conveyor belts 92a and 92b. As the food items 52 are squeezed within the gap d, the food items 52 do not slip between the conveyor belts 92a and 92. The heater 82a and 82b under the conveyor belts 92a and 92b provides heat to grill the food items 52.

The grilling structures 80a and 80b in the illustrated example are obliquely oriented at an angle of G° from the vertical Y direction (i.e., up and down in FIG. 1). In one example, the angle G is 5°. However, it is to be understood that other angles G are possible.

The conveyor belts 92a and 92b are made of any suitable material having a low coefficient of thermal expansion. In one example, the conveyor belts 92a and 92b are made of non-stick coated Invar™ commercially available from Imphy S.A. Corporation of Paris, France. Invar™ is a metal alloy comprised of Iron and 36% Nickel, and may include other trace elements. In one example, the non-stick coating on the Invar™ is Teflon™ commercially available from E. I. DuPont Nemours and Company Corporation of Wilmington, Del. Invar has a low constant of thermal expansion and therefore expands very little when heated. Although Invar™ has been disclosed, it is to be understood that other materials having a low coefficient of thermal expansion can be used.

The distance d between the grilling structures 80a and 80b is set by threaded members 96. The distance d varies along the length of the grilling structures 80a and 80b and is determined by the size of the food items 52. By varies, it is meant that the distance d can be larger at different positions along the length of the grilling structures 80a and 80b. Preferably, the distance d is constant at each position along the length of the grilling structures 80a and 80b. However, the distance d can be adjustable by the threaded members 96 to allow for grilling different sizes of the food items 52 for a given grilling component 26.

Figure 3:
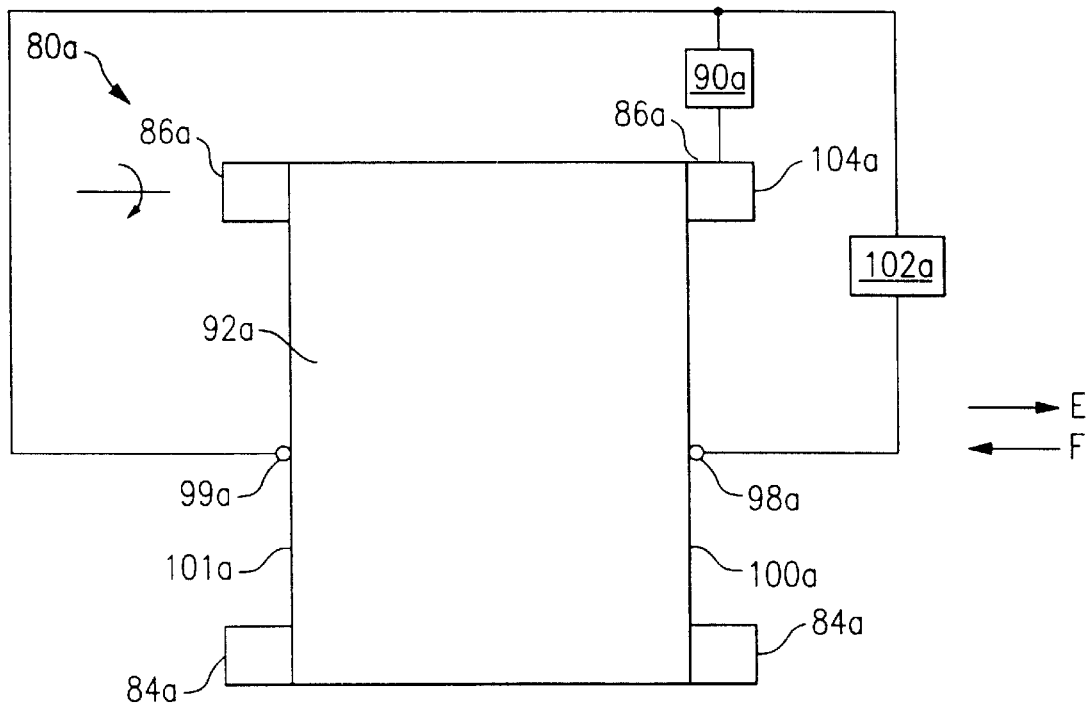
FIG. 3 schematically illustrates a side view of the grilling component.

During operation of the grilling component 26, it may be possible for the conveyor belts 92a and 92b to move laterally in the directions E or F (i.e., right or left, respectively, as shown in FIG. 3) and slide off of the pulleys 84a, 84b, 86a and 86b. As shown in FIG. 3, lateral sensors 98a and 98b positioned proximate to each of the respective edges 100a and 100b of the conveyor belts 92a and 92b, and another lateral sensor 99a and 99b is positioned proximate to the respective edges 101a and 101b of the conveyor belts 92a and 92b. The lateral sensors 98a, 98b, 99a and 99b continually monitor the position of the edges 100a, 100b, 101a, and 101b. If lateral movement is detected by the lateral sensors 98a or 99a, a controller 102a sends a signal to the adjustment motor 90a to move an end 104a of the non-drive pulley 86a to adjust for the lateral movement. Preferably, the lateral sensor 98a in one example is a non-contacting inductive proximity sensor. The adjustment motor 90a rotates to move the non-drive pulley 86a to return the conveyor belt 92a to the desired position.

If the conveyor belt 92a has moved in the direction E (i.e., to the right in FIG. 3), the lateral sensor 99a does not sense the edge 101a of the conveyor belt 92a. The controller 102a then sends a signal to the adjustment motor 90a which rotates to raise the end 104a of the non-drive pulley 86a and move the conveyor belt 92a in the direction F (i.e., to the direction left in FIG. 3). After a predetermined amount of time, the lateral sensor 99a again tries to detect the presence of the edge 101a of the conveyor belt 92a. If the edge 101a of the conveyor belt 92a is detected, no further adjustment is needed. If the edge 101a of the conveyor belt 92a is not detected, the adjustment motor 90a rotates again to raise the end 104a of the non-drive pulley 86a to again move the conveyor belt 92a in the direction F. This is repeated until the conveyor belt 92a is detected by the sensor 99a.

Alternatively, if the conveyor belt 92a has moved in the direction F (i.e., to the left in FIG. 3), the lateral sensor 98a does not sense the edge 100a of the conveyor belt 92a. The controller 102a then sends a signal to the adjustment motor 90a which rotates to lower the end 104a of the non-drive pulley 86a and move the conveyor belt 92a in the direction E (i.e., to the direction right in FIG. 3). After a predetermined amount of time, the lateral sensor 98a again tries to detect the presence of the edge 100a of the conveyor belt 92a. If the edge 100a of the conveyor belt 92a is detected, no further adjustment is needed. If the edge 100a of the conveyor belt 92a is not detected, the adjustment motor 90a rotates again to lower the end 104a of the non-drive pulley 86a to again move the conveyor belt 92a in the direction E. This is repeated until the edge 100a of the conveyor belt 92a is detected by the sensor 98a in the desired location. Although two sensors 98a, 99a and 98b, 99b are disclosed for each conveyor belt 92a and 92b, it is to be understood that only one sensor can be employed. Additionally, it is to be understood that sensors 98a and 98b operate in a similar manner.

Figure 4:
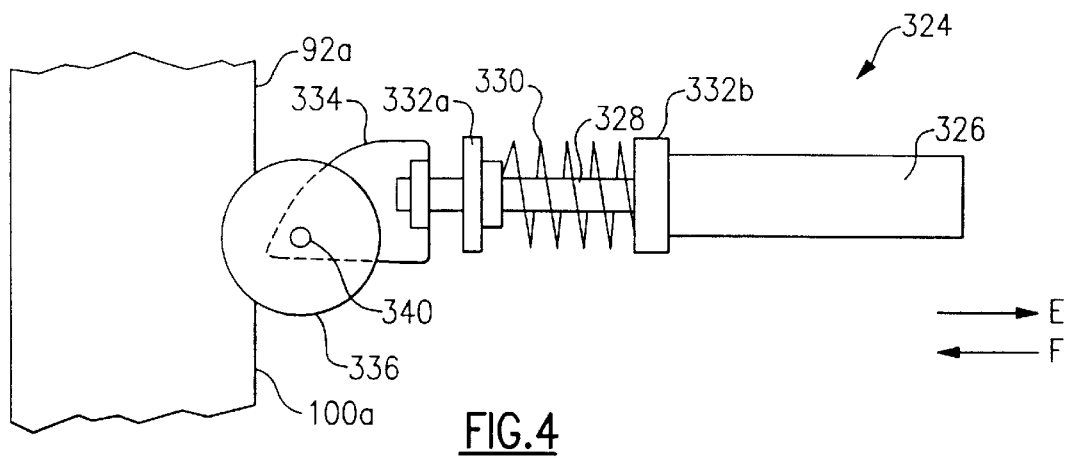
FIG. 4 schematically illustrates a side view of a second example of a lateral sensor.
Figure 5:
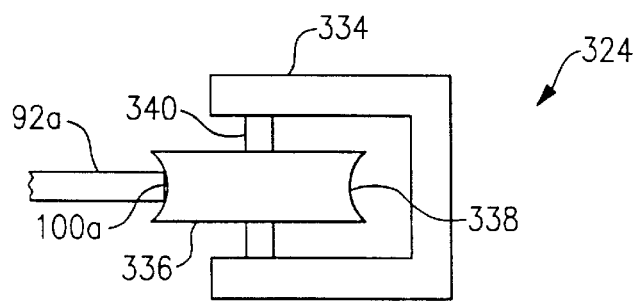
FIG. 5 schematically illustrates a top view of a second example of a lateral sensor.

FIGS. 4 and 5 illustrate a second example of a lateral sensor 324. The lateral sensor 324 includes a proportional sensor 326, such as a linear variable displacement transducer or a linear potentiometer, having a shaft 328. A spring 330 is positioned between a pair of washers 332a and 332b on the shaft 328 and provides resistance to a yoke 334. A rotatable wheel 336 having a groove 338 is secured to the yoke 334 by a rod 340. In one example, the rotatable wheel 336 is ½ inch in diameter and has a thickness of ⅛ inch to accommodate the conveyor belt 92a and 92b dimensions. The groove 338 contacts the edge 100a of the conveyor belt 92a.

The proportional sensor 326 determines if the edge 100a of the conveyor belt 92a has moved laterally by monitoring the resistance in the spring 330. If the edge 100a of the conveyor belt 92a moves in the direction E, the yoke 334 responsively compress the spring 330, increasing the resistance in the spring 330. The controller 102a receives a corresponding indication from the proportional sensor 326 and responsively sends a signal to the adjustment motor 90 to raise the end 104a of the non-drive pulley 86a and laterally adjust the conveyor belt 92a a proportional amount in the direction F. Alternatively, if the edge 100a of the conveyor belt 92a moves in the direction F, the yoke 334 responsively expands the spring 330, decreasing the resistance in the spring 330. The controller 102a receives a corresponding indicating from the proportional sensor 326 and responsively sends a signal to the adjustment motor 90 to lower the end 104a of the non-drive pulley 86a and laterally adjust the conveyor belt 92a a proportional amount in the direction E.

Figure 6:
FIG. 6 schematically illustrates a top view of a third example of a lateral sensor.

Alternatively, as shown in FIG. 6, a lateral sensor 424a and 425a including a Hall effect sensor 430a and 431a, respectively, is positioned proximate to each of the respective edges 100a and 101a. The edges 100a and 101a of the conveyor belt 92a are positioned in a channel 426a and 427a, respectively, in the lateral sensor 424a and 425a, respectively. As the edge 100a of the conveyor belt 92a moves laterally in the direction F away from the channel 426a, the Hall effect sensor 430a detects a change in the magnetic field 428a, indicating that the edge 100a of the conveyor belt 92a has moved laterally. The conveyor belt 92a is laterally adjusted in the direction F by rotating the adjustment motor 90a in the manner described above. Alternatively, as the edge 101a of the conveyor belt 92a moves laterally in the direction E away from the channel 427a, the Hall effect sensor 431a detects a change in the magnetic field 429a, indicating that the edge 101a of the conveyor belt 92a has moved laterally. The conveyor belt 92a is laterally adjusted in the direction F by rotating the adjustment motor 90a in the manner described above. Although not shown, it is to be understood that a lateral sensor including a Hall effect sensor (not shown) is positioned on the edges 100b and 101b of the conveyor belt 92b.

Returning to FIG. 1, after exiting the grilling component 26, each item of food 52 slides down an exit ramp 106 and onto a holding area 108 for storage until removal for serving. Preferably, the holding area 108 consists of a plurality of rollers 114. A heater 110 is positioned over the holding area 108 to heat the food items 52. An automatic seasoner 112 can also be positioned over the holding area 108 to dispense selected seasonings such as salt on the food items 52 after grilling.

The grill component 26 can further include a grease dripper 116 (shown in FIG. 2) or a grill scraper to clean the conveyor belts 92a and 92b. A hood 120 can also be placed above the grill component 26 to provide ventilation.

The grill component 26 of the present invention can be used with an automated grill, such as described in co-pending patent application Ser. No. 10/124,629 entitled "Automated grill" filed on Apr. 17, 2002.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A grilling component comprising:
   a first substantially vertical grilling structure including a first heater, a first endless member moveable around said heater, and a first drive motor to drive said first endless member; and
   a second substantially vertical grilling structure including a second heater, a second endless member moveable around said second heater, and a second drive motor to drive said second endless member, and said first grilling structure and said second grilling structure are separated by a gap.

2. The grilling component as recited in claim 1 wherein said first drive motor drives a first drive pulley to drive said first endless member and said second drive motor drives a second drive pulley to drive said second endless member.

3. The grilling component as recited in claim 2 further including a controller that provides a pulse to said first drive motor and said second drive motor to move said first endless member and said second endless member at an equal speed.

4. The grilling component as recited in claim 2 wherein said first substantially vertical grilling structure further includes a first non-drive pulley and a first adjustment mechanism, and said second substantially vertical grilling structure further includes a second non-drive pulley and a second adjustment mechanism, and said first adjustment mechanism moves said first non-drive pulley to laterally adjust said first endless member and said second adjustment mechanism moves said second non-drive pulley to laterally adjust said second endless member.

5. The grilling component as recited in claim 1 further including a holding area and an exit, and said holding area is proximate to said exit of said grilling component.

6. The grilling component as recited in claim 5 wherein said holding area is heated.

7. The grilling component as recited in claim 1 wherein said first endless member and said second endless member is a conveyor belt.

8. The grilling component as recited in claim 1 wherein said gap has a width, and said width of said gap is constant along a length of said first substantially vertical grilling structure and said second substantially vertical grilling structure.

9. The grilling component as recited in claim 1 wherein said first heater and said second heater are electric resistance heaters.

10. The grilling component as recited in claim 1 wherein said first endless member and said second endless member are made of a non-stick material.

11. The grilling component as recited in claim 1 wherein said first heater and said second heater are heated to 400° F.

12. The grilling component as recited in claim 1 wherein said first heater and said second heater are flat.

13. The grilling component as recited in claim 1 wherein an item is grilled while traveling in said gap.

14. The grilling component as recited in claim 1 wherein said first heater heats said first conveyor belt and said second heater heats said second conveyor belt, and said first conveyor belt and said second conveyor belt heat an item traveling between said first conveyor belt and said second conveyor belt.

15. The grilling component as recited in claim 1 wherein said gap has a width, and said width of said gap is adjustable.

16. A grilling component comprising:
   a first grilling structure and a second grilling structure separated by a gap, each of said first grilling structure and said second grilling structure including a heater and a moveable endless member, and said first grilling structure and said second grilling structure are angled approximately 5° from a vertical plane.

17. A method for grilling an item comprising the steps of:
   providing a first substantially vertical grilling structure and a second substantially vertical grilling structure separated by a gap, and said first substantially vertical grilling structure and said second substantially vertical grilling structure each include a heater and an endless member moveable around the heater;
   driving the endless member of the first substantially vertical grilling structure with a first drive motor;
   driving the endless member of the second substantially vertical grilling structure with a second drive motor;
   loading the item into said grilling component;
   moving the item in said gap of said grilling component;
   grilling the item in said grilling component; and
   transferring the item out of said grilling component.

18. The method as recited in claim 17 wherein said first substantially vertical grilling structure and said second substantially vertical grilling structure are angled approximately 5° from a vertical plane.

19. The method as recited in claim 17 wherein said width of said gap is adjustable.

20. The method as recited in claim 17 wherein including the step of synchronizing a speed said first drive motor and said second drive motor.

21. A grilling component comprising:
   a first grilling structure and a second grilling structure separated by a gap having a width, and said width of said gap is adjustable, and each of said first grilling structure and said second grilling structure includes a heater and a endless member moveable around said heater, and wherein said width of said gap varies along a length of said grilling surface.

* * * * *